United States Patent
Wallen et al.

(10) Patent No.: US 6,786,633 B2
(45) Date of Patent: Sep. 7, 2004

(54) METHOD AND ARRANGEMENT FOR ACOUSTICALLY DETERMINING A FLUID TEMPERATURE

(75) Inventors: Lars Wallen, Spanga (SE); Goran Skog, Bromma (SE)

(73) Assignee: Maquet Critical Care AB, Solna (SE)

( * ) Notice: Subject to any disclaimer, the term of this patent is extended or adjusted under 35 U.S.C. 154(b) by 0 days.

(21) Appl. No.: 10/062,056

(22) Filed: Feb. 1, 2002

(65) Prior Publication Data

US 2002/0105999 A1 Aug. 8, 2002

(30) Foreign Application Priority Data

Feb. 7, 2001 (SE) ................................................ 0100379

(51) Int. Cl.[7] .......................... G01K 11/22; G01K 13/00
(52) U.S. Cl. ........................ 374/117; 374/142; 374/148; 73/645; 73/597
(58) Field of Search ..................... 374/117–119, 142, 374/148, 32; 73/24.01, 28.01, 587, 597, 645

(56) References Cited

U.S. PATENT DOCUMENTS

| | | | | |
|---|---|---|---|---|
| 3,600,515 A | * | 8/1971 | Carpenter | 179/1 SA |
| 3,621,453 A | * | 11/1971 | Ringwall et al. | 73/339 A |
| 4,015,470 A | | 4/1977 | Morrison | |
| 4,080,837 A | | 3/1978 | Alexander et al. | |
| 4,196,626 A | * | 4/1980 | Manion et al. | 73/339 A |
| 4,255,971 A | * | 3/1981 | Rosecwaig | 73/606 |
| 4,484,820 A | * | 11/1984 | Rosencwaig | 374/6 |
| 4,527,433 A | | 7/1985 | Gutterman | |
| 4,578,584 A | * | 3/1986 | Baumann et al. | 250/341 |
| 4,683,750 A | * | 8/1987 | Kino et al. | 73/606 |
| 4,867,564 A | * | 9/1989 | Sweeney et al. | 356/349 |
| 4,984,903 A | * | 1/1991 | Sweeney | 374/123 |
| 4,997,273 A | * | 3/1991 | Leonard et al. | 356/43 |
| 5,141,331 A | * | 8/1992 | Oehler et al. | 374/118 |
| 5,596,146 A | * | 1/1997 | Waller et al. | 73/590 |
| 5,624,188 A | * | 4/1997 | West | 374/119 |
| 6,202,480 B1 | * | 3/2001 | Mauze et al. | 73/77 |
| 6,286,360 B1 | * | 9/2001 | Drzewiecki | 73/24.01 |
| 6,363,773 B1 | * | 4/2002 | Bowers | 73/24.06 |
| 6,481,287 B1 | * | 11/2002 | Ashworth et al. | 73/597 |
| 2003/0029242 A1 | * | 2/2003 | Yaralioglu et al. | 73/597 |
| 2003/0043880 A1 | * | 3/2003 | Meyler et al. | 374/32 |

FOREIGN PATENT DOCUMENTS

| | | | | |
|---|---|---|---|---|
| AU | 000646576 B | * | 1/1993 | 374/117 |
| DE | 3102334 | * | 12/1981 | 374/119 |
| DE | 44 42 078 | | 11/1994 | |
| EP | 0 352 203 | | 1/1990 | |
| EP | 0 826 951 | | 3/1998 | |
| JP | 0184525 | * | 10/1983 | 374/119 |
| JP | 61134639 A | * | 6/1986 | G01K/11/24 |
| JP | 2176434 | | 7/1990 | |

OTHER PUBLICATIONS

Patent Abstracts of Japan Publication No. 57157127 (Feb. 28, 1982) for Japanese Application No. 56042485.

* cited by examiner

*Primary Examiner*—Gail Verbitsky
(74) *Attorney, Agent, or Firm*—Schiff Hardin LLP

(57) ABSTRACT

In a method and an arrangement for acoustic determination of an instantaneous fluid temperature, acoustic velocity V in a fluid is monitored and an output signal related to the acoustic velocity is generated. A conventional temperature sensor senses a fluid temperature $T_S$ and generates an output signal related thereto. A signal processor receives the signals from the sensor and the acoustic velocity monitor determines the instantaneous fluid temperature $T_A$ based on a relationship:

$$T_A = kV^2;$$

where k is a constant dependent on the composition of the fluid that is calculated within the signal processor based on the relationship:

$$k = T_S/V^2$$

8 Claims, 4 Drawing Sheets

METHOD AND ARRANGEMENT FOR ACOUSTICALLY DETERMINING A FLUID TEMPERATURE

BACKGROUND OF THE INVENTION

1. Field of the Invention

The present invention relates to an arrangement and a method for acoustically determining the temperature of a fluid, and in particular for acoustically determining the temperature of a gas of unknown composition.

2. Description of the Prior Art

Conventional, non-acoustic, temperature sensors, such as thermocouples, thermistors and resistance thermometers, operate by monitoring their own temperatures, for example by monitoring temperature induced changes in electrical properties of the material of which they are constructed. Therefore, such sensors generally operate independently of the composition of the gas whose temperature is being monitored. Moreover, conventional temperature sensors generally have a relatively long time constant (of the order of a few seconds) and therefore are generally insensitive to rapid temperature variations.

Acoustic temperature sensors are known which operate by measuring the propagation time of an acoustic wave, typically ultrasound, through a fluid of known composition, from which the acoustic velocity V in the fluid is obtained according to the known relationship between propagation time t and propagation length L, which is expressed by the equation:

$$V = L/t \qquad (1)$$

The temperature of the fluid can then be determined, for example utilizing the known relationship as expressed by the equation (2) below. Acoustic temperature sensors have a relatively short time constant (on the order of a few milliseconds) and therefore effectively measure an instantaneous temperature of the fluid. This makes them well suited for measuring rapid and transient temperature changes in a fluid system, for example induced by corresponding rapid and transient pressure fluctuations within the fluid. However, since the acoustic velocity also depends on the composition of the fluid through which it propagates, acoustic temperature sensors are sensitive to the composition of the fluid, the temperature of which they are being employed to determine.

Known acoustic temperature sensors include means for monitoring the acoustic velocity in the fluid, the temperature of which is to be determined, and for producing an output signal related to the monitored velocity. A processor is coupled to this means to receive the output signal and to calculate the temperature of the fluid based on the known relationship between the fluid temperature T and the acoustic velocity (for example obtained utilizing the equation (1) above), which is expressed by the equation:

$$T = kV^2 \qquad (2)$$

where k is a constant related to the composition of the fluid.

Typically, the means producing the output signal is formed by an acoustic signal transmitter, a complementary acoustic signal receiver located relative to the transmitter to receive an acoustic signal from the transmitter after propagating a predetermined distance through the fluid and a timing device coupled to the receiver which determines the propagation time of an acoustic signal between the transmitter and the receiver in response to the receipt of the acoustic signal by the receiver, and which supplies a signal indicative of this propagation time to the processor, where it is employed in the calculation of the fluid temperature.

SUMMARY OF THE INVENTION

An object of the present invention is to provide a method and an arrangement for acoustically determining an instantaneous fluid temperature, which are insensitive to rapid temperature fluctuations.

The above object is achieved in accordance with the principles of the present invention in a method and an arrangement for acoustically determining an instantaneous fluid temperature wherein an acoustic velocity of a fluid is monitored and an output signal related to the acoustic velocity is generated, and wherein a conventional temperature sensor is employed for sensing a fluid temperature, which generates an output signal related to the fluid temperature, and wherein these output signals are processed to determine the instantaneous fluid temperature therefrom.

By directly sensing a fluid temperature using a conventional, non-acoustic, temperature sensor, a temperature sensing arrangement is provided which is insensitive to rapid temperature fluctuations and from which information related to the composition of the fluid can be derived and employed in the determination of the instantaneous fluid temperature based on the monitored acoustic velocity. Thus, the arrangement according to the present invention can be used in situations where the composition of the fluid is unknown or varies over time (i.e., over a time that is longer than the time constant of the conventional temperature sensor).

Preferably a value of the constant k is calculated as a time averaged value $\bar{k}$ based on the equation (2) above from the signals received by the signal processor which are related to the acoustic velocity and the sensed temperature and updated periodically. This averaging mitigates any effects of rapid and transitory temperature changes in the fluid when deriving the information related to the fluid composition.

In the inventive method as well, by obtaining the value of the acoustic velocity in a fluid and obtaining the value of the sensed fluid temperature using a conventional temperature sensor, the instantaneous fluid temperature can be determined dependent on the obtained acoustic velocity value and the sensed fluid temperature even for a fluid of unknown composition.

The sensed fluid temperature is employed to derive information and preferably a time averaged value thereof obtained using the equation (2) above, related to the composition of the fluid which is then used to determine the instantaneous fluid temperature according to the obtained acoustic velocity.

DESCRIPTION OF THE PREFERRED EMBODIMENTS

Figure 1:
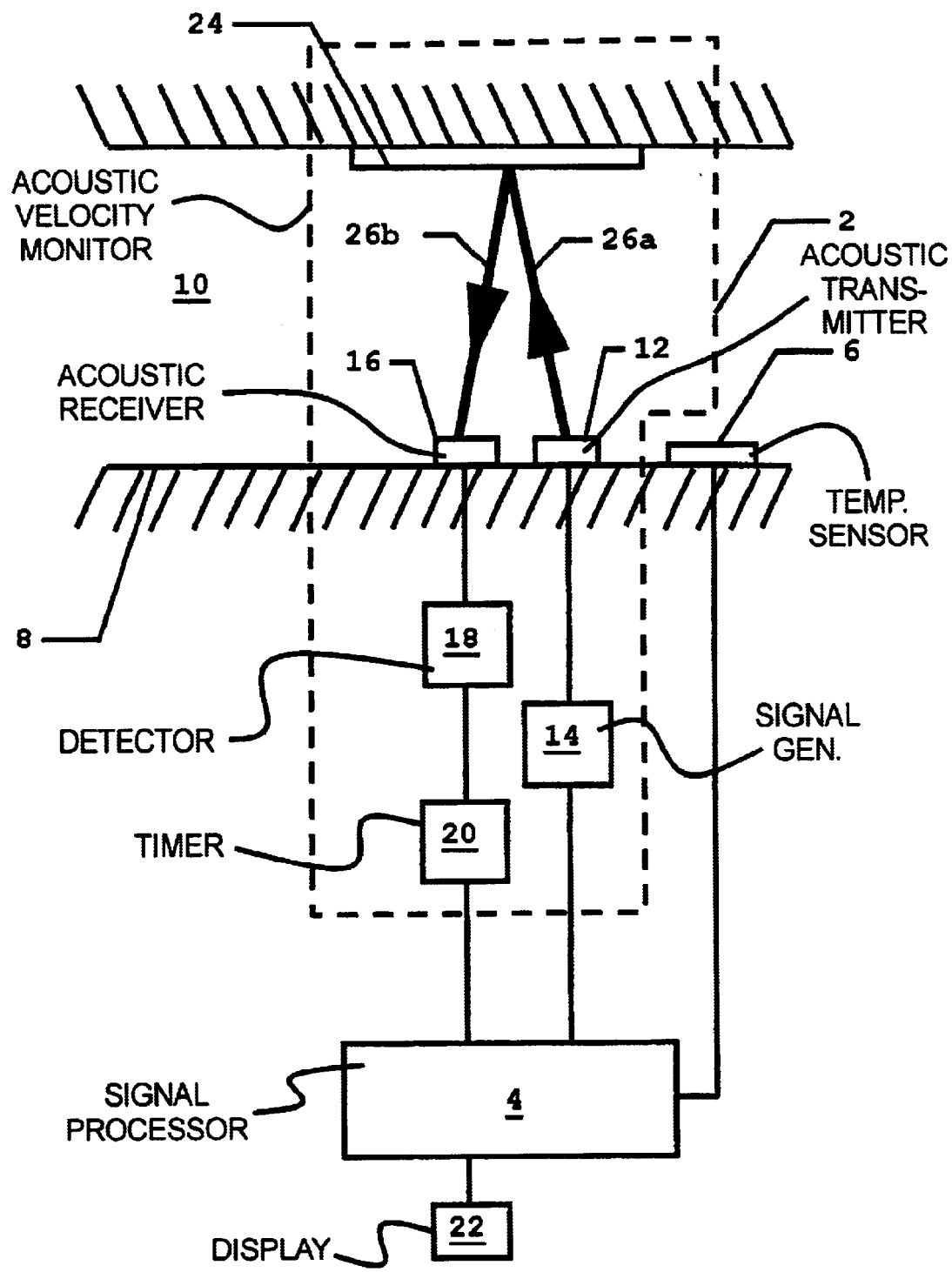
FIG. 1 is a schematic block diagram of a first embodiment of an apparatus according to the present invention.

FIG. 1 shows an arrangement for acoustically determinating an instantaneous fluid temperature which has an acoustic velocity monitor 2 operably coupled to a signal processor 4 and a conventional temperature sensor 6 located within a conduit 8 which defines a flow path for a fluid 10, the temperature of which is to be determined acoustically, and operably coupled to the signal processor 4. The signal processor 4 may be a conventional microprocessor within a personal computer, suitably programmed and provided with interface cards to facilitate communication with the external equipment as herein described.

In the present example the conventional temperature sensor 6 is a known resistance-type thermometer having an electrical output directly related to its temperature, but any known conventional sensor may be substituted, such as a thermistor or a thermocouple, whose operation is independent of the composition of the fluid, the temperature of which it is being employed to sense.

The acoustic velocity monitor 2 is of a type well known in the art of acoustic temperature sensors and, therefore, will be described only in sufficient detail to provide an understanding of its principles of operation. The monitor 2 has a transmitting transducer 12 capable of converting an electrical signal at a desired frequency supplied from a signal generator 14 into a corresponding acoustic, typically ultrasound, signal within the fluid 10 in the conduit 8. A receiving transducer 16, capable of converting an incident acoustic signal from within the fluid 10 into a corresponding electrical signal, also is provided coupled to a detector 18. The detector 18 provides an output indicating the presence of the signal at the receiving transducer 16, and may be a known zero-crossing detector, preferably provided with discriminator circuitry to discriminate against received acoustic signals at frequencies other than the frequency or frequencies transmitted by the transducer 12. A conventional timer 20 is operably coupled to the signal generator 14 and the detector 18 for measuring the time elapsed between the supply of the electrical signal by the signal generator 14, in the present example indicated by a timing signal output from the signal generator 14 to the timer 20, and the detection by the detector 18 of receipt of a signal by the receiving transducer 16, in the present example indicated by a detection signal output from the detector 18 to the timer 20. The timer 20 generates an output signal related to the measured elapsed time, for example either as a direct indication of the elapsed time or, following further processing, as a direct indication of a calculated acoustic velocity. The output signals from the timer 20 and from the temperature sensor 6 are received by the signal processor 4 which determines from these signals a value of the instantaneous fluid temperature, as explained in greater detail below. As in the present example, the signal processor 4 may be further adapted to drive a visual display 22 to present thereon a representation of the determined instantaneous fluid temperature.

In the present example the transmitting transducer 12 and the receiving transducer 16 are arranged in a side-by-side relationship with a reflector element 24 arranged opposite the transducers 12,16 so as to be able to reflect incident acoustic radiation from the transmitting transducer 12 toward the receiving transducer 16. The transducers 12,16 are located such that their separation from each other is substantially less than their separation from the reflector element 24. This means that the transmitted sound and the reflected sound will effectively propagate along the same path (as indicated by the arrowed lines 26a and 26b respectively). This is important for reducing the effect on the measured acoustic velocity of movements of the fluid 10. While this is useful, it will be appreciated by those skilled in the art that the transducers 12,16 may be disposed opposite one another across the conduit 8.

Still referring to FIG. 1, the methodology by which the arrangement according to the present invention operates will now be described with reference also to the flow diagrams of FIGS. 2 to 4.

Figure 2:
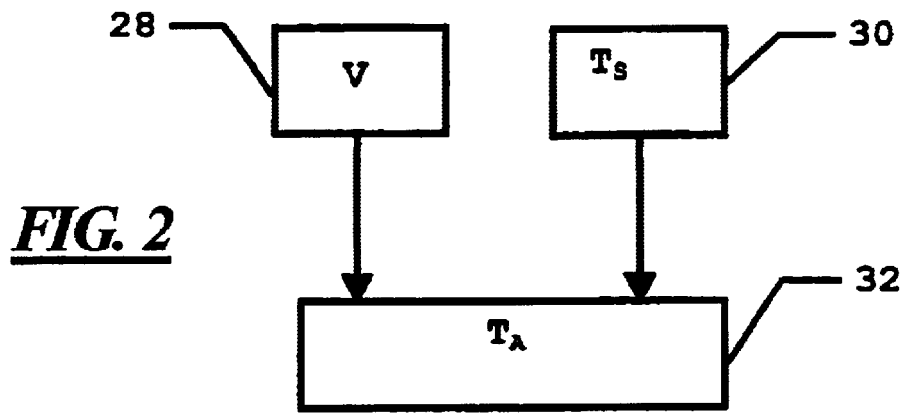
FIG. 2 is a flowchart showing the procedure of the arrangement according to the present invention to determine the instantaneous temperature.

The basic methodology is shown in FIG. 2. In step 28 the acoustic velocity in the fluid 10 is obtained. In this step 28 the transit time t of the acoustic signal through the fluid 10 is measured by the monitor 2 and supplied to the signal processor 4 wherein the value of the velocity V is obtained from the previously mentioned equation (1):

$$V = L/t$$

where L is the length of the propagation path 26a,26b through the fluid 10 and which, being a predetermined value, is stored within the signal processor 4.

In step 30 the sensed temperature $T_S$ of the fluid 10 is obtained. In this step 30 the output from the conventional temperature sensor 6 is supplied to the signal processor 4 as a measure of the sensed temperature, $T_S$.

In step 32 the instantaneous fluid temperature, $T_A$, is determined. In this step 32 the signal processor 4 operates to determine the instantaneous fluid temperature, $T_A$, from the previously mentioned equation (2).

$$T_A = kV^2$$

The signal processor 4 is further configured to calculate a value of the constant k according to the equation (2) rewritten as:

$$k = T_S/V^2$$

The value of the constant k used in the determination of the instantaneous temperature $T_A$ in the step 32 may be calculated by the signal processor 4 in a number of ways based on the obtained values of sensed temperature $T_S$ and acoustic velocity V. For example, the constant k may be simply calculated using the velocity V and the sensed temperature $T_S$ values obtained in the previous steps 28 and 30. The value of the constant k may be, for example, calculated as a rolling value as shown in the method steps of FIG. 3.

However, over a period of time the average temperature measured acoustically should be the same as the average temperature measured by the sensor. From equation (2) this means that the average temperature measured by the sensor is proportional to the average of the square of the acoustic velocity. The constant k is preferably calculated in the signal processor 4 as an average value $\bar{k}$ determined from a number of obtained values of the velocity V and also preferably, a number of values of the sensed temperature $T_S$ values obtained during a first time period. This averaging effectively mitigates the effects of rapid temperature changes, as monitored acoustically, on the determination of the constant k which is dependent on the composition of the fluid. This average value of the constant $\bar{k}$ is then used in determining values of the instantaneous temperature $T_A$ from individual values of the velocity V obtained during a subsequent, second time period as shown in the method steps of FIG. 4.

Inherent in the determination of the instantaneous temperature $T_A$ in this manner is the assumption that the composition of the fluid (and hence the value of k) is constant or varying only slightly within the averaging period. Moreover, in situations where the temperature $T_S$ monitored by the temperature sensor 6 varies cyclically, and if the averaging period is greater than the time constant of the temperature sensor 6, then the averaging period, the first time period described above, preferably should be selected to coincide with a whole number of cycles of the sensed temperature $T_S$. This can readily be determined by monitoring the temperature $T_S$ during a calibration phase.

Figure 3:
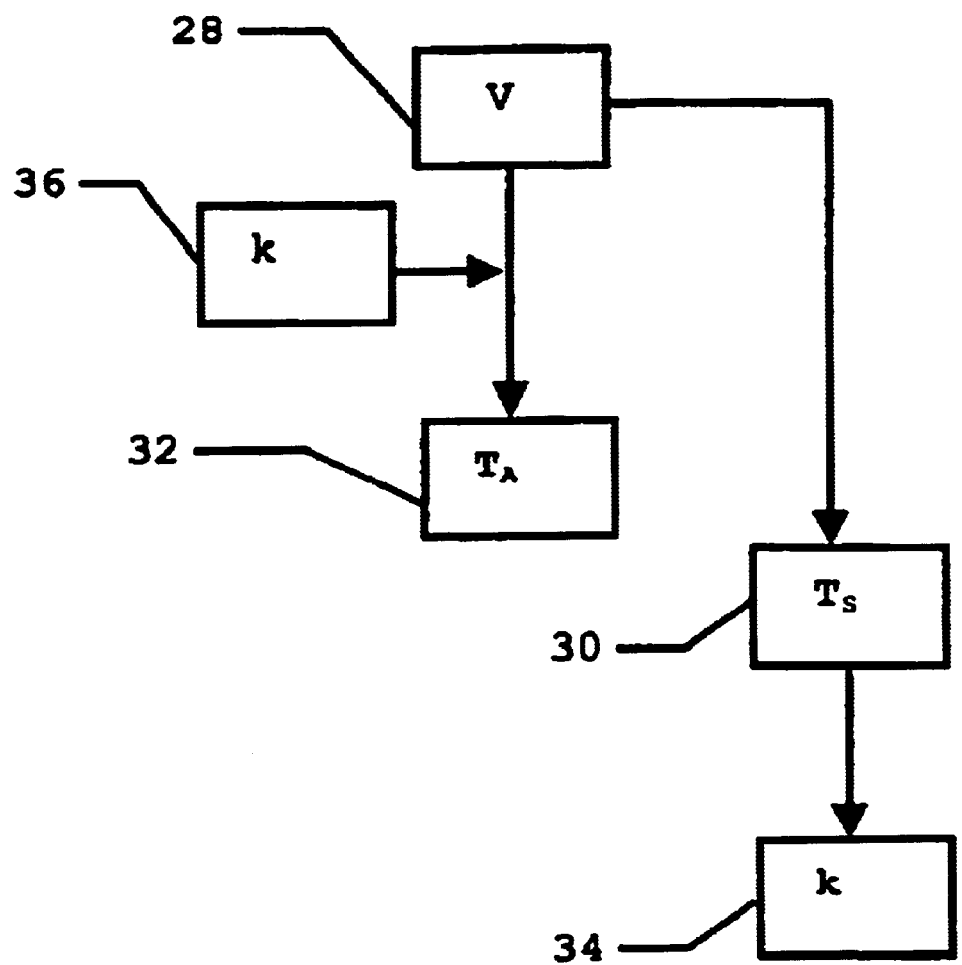
FIGS. 3 and 4 are flowcharts showing alternative procedures to calculate a value of the constant k in the arrangement according to the present invention.

In FIG. 3 the method steps described in relation to FIG. 2 are provided with the same reference numerals. For the methodology of FIG. 3, the arrangement of FIG. 1 is configured to operate by calculating the constant k as a rolling value, for use in a subsequent determination of the instantaneous temperature $T_A$.

In step 28 the acoustic velocity V in the fluid 10 as described above in relation to FIG. 2.

In step 30 the sensed temperature $T_S$ of the fluid 10, is obtained as described above in relation to FIG. 2. Those skilled in the art will understand that because of the relatively long time constant of the temperature sensor 6, the temperature emitted by the temperature sensor 6 need not be acquired each time the acoustic velocity V is obtained. Rather, the sensed temperature value $T_S$ can be periodically acquired dependent on this time constant.

In step 34 the value of the constant k is calculated for subsequent use according to the equation (2):

$$k = T_S/V^2$$

In step 36 the value of the constant k, calculated in a previous step 34 using values of acoustic velocity V and sensed temperature $T_S$ which were obtained in previous steps 28 and 30 respectively, is made available.

In step 32 the instantaneous gas temperature $T_A$ is determined. In this step 32 the signal processor 4 operates to determine the instantaneous gas temperature $T_A$ from equation (2):

$$T = kV^2$$

using a value of acoustic velocity V obtained in the present step 28 and the value of the constant k obtained in the present step 36.

Figure 4:
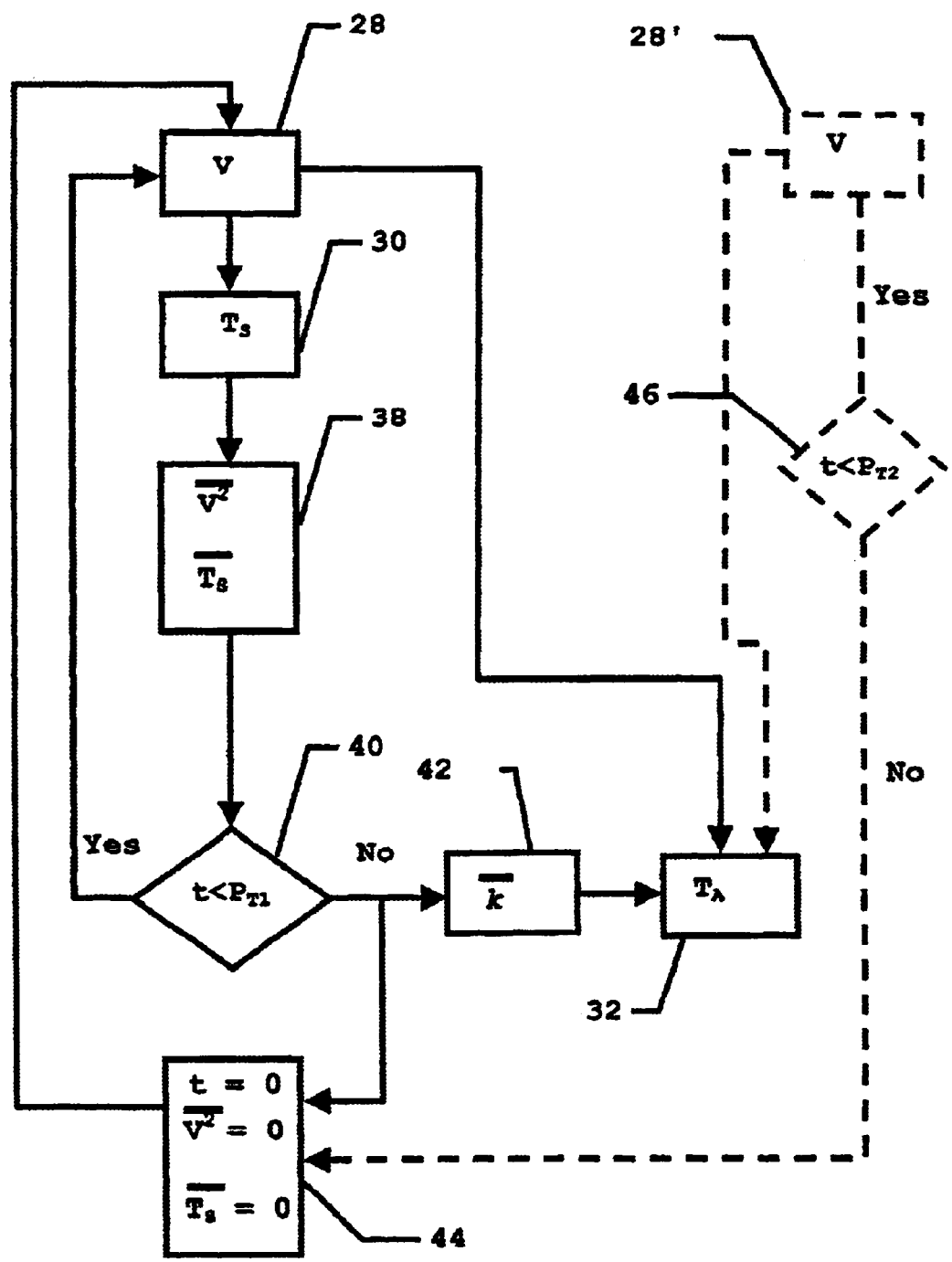

FIG. 4 shows an alternative method for determining the instantaneous acoustic temperature $T_A$ using the arrangement of the present invention. In FIG. 4 the method steps described in relation to FIG. 2 are provided with the same reference numerals. The value of the gas constant k is here calculated as an average $\bar{k}$ determined from values obtained during a first predetermined time period $P_{T1}$ which is preferably less than or substantially equal to the time constant of the conventional temperature sensor 6, as described below.

The step 28 the value of the acoustic velocity V in the fluid 10, as described above in relation to FIGS. 2 and 3, is obtained in the signal processor 4.

In step 30 the value of the sensed temperature $T_S$ of the fluid 10, as described above in relation to FIGS. 2 and 3, is obtained in the signal processor 4.

In step 38 the acoustic velocity V and the sensed temperature $T_S$, obtained in steps 28 and 30 respectively, are supplied to the signal processor 4 which calculates average values of sensed temperature $\overline{T_S}$ and the square of the acoustic velocity $\overline{V^2}$.

In order to speed up processing the number of multiplication steps can be reduced by modifying this step 38 to calculate an average value of the velocity $\overline{V}$. An average value $(\overline{V})^2$ is subsequently formed. This will introduce a small error into the value of the average gas constant $\bar{k}$ obtained in step 42 below.

In step 40 it is determined whether an elapsed time t is less than the predetermined first time period $P_{T1}$. In the present example the signal processor 4 is configured to originate a timing signal as a measure of the elapsed time t based on the frequency of its internal clock, in a manner common in the art.

In other embodiments, the timing signal may originate from or be triggered by ancillary equipment, for example when the arrangement of the present invention is used to measure gas temperature in a known patient ventilator system the period $P_{T1}$ is usefully an inspiration phase or an expiration phase of a breathing cycle generated by the ventilator, and the timing signal is triggered or originated by the ventilator during the appropriate phase.

If the elapsed time t is within the first time period $P_{T1}$ then the steps 28, 30, and 38 are repeated until the elapsed time exceeds the value of $P_{T1}$ as determined in step 40.

If the elapsed time t is greater than the first time period $P_{T1}$, then in step 42 the value of the average gas constant $\bar{k}$ is determined. The signal processor 4 calculates this value according to the equation (2), rewritten as:

$$\bar{k} = \overline{T_S}/\overline{V^2}$$

and in 44 the elapsed time t and the average values $\overline{T_S}$ and $\overline{V^2}$ are reset to zero. The loop formed by steps 28 and 40 may then be repeated.

In parallel with the steps 28, 30, 38 and 40, in step 32 the instantaneous gas temperature $T_A$ is determined. This step 32 may alternatively be included within the loop formed by the steps 28 and 40. In this step 32 the signal processor 4 operates to determine the instantaneous gas temperature $T_A$ from the previously mentioned equation (2), written as:

$$T_A = \bar{k}V^2$$

where V is the acoustic velocity obtained in step 28 and $\bar{k}$ is the average value of the constant k obtained in step 42 after a previous, corresponding time period $P_{T1}$. Thus the average $\bar{k}$ determined in one time period $P_{T1}$ is employed in the calculation of the instantaneous, acoustic temperature $T_A$ during a next time period $P_{T1}$.

In the present example the values of the acoustic velocity V used to calculate the instantaneous acoustic temperature $T_A$ are some or all of those obtained from the step 28, during the first time period $P_{T1}$. It will be appreciated by those skilled in the art that this process may alternatively occur during a second time period $P_{T2}$ of a different duration than that of the first period $P_{T1}$. During this period $P_{T2}$ new values of acoustic velocity are obtained in step 28' (shown as broken lines in FIG. 4), analogous to the step 28. In step 40', analogous to the step 40, an elapsed time t' is compared with the second time period $P_{T2}$ (also shown as broken lines in FIG. 4). If it is determined in step 46 that the elapsed time t' is within the time period $P_{T2}$ then the steps 28' and 32 are repeated to determine a new instantaneous temperature $T_A$. If it is determined in step 46 that the elapsed time t' is greater than the time period $P_{T2}$ then the step 44 may be initiated to reset the values, and the loop formed by steps 28 and 40 repeated to obtain a new average value $\bar{k}$ in step 42.

In a modification to the method described in relation to FIG. 4, the loop formed by the steps 28 and 40 and the step 42 to calculate a new average value $\bar{k}$ may be repeated only intermittently, or even carried out only once to calibrate the arrangement for use to measure the temperature of a particular composition of fluid (this may be effected through suitable choices of the periods $P_{T1}$ and $P_{T2}$ as discussed above).

Figure 5:
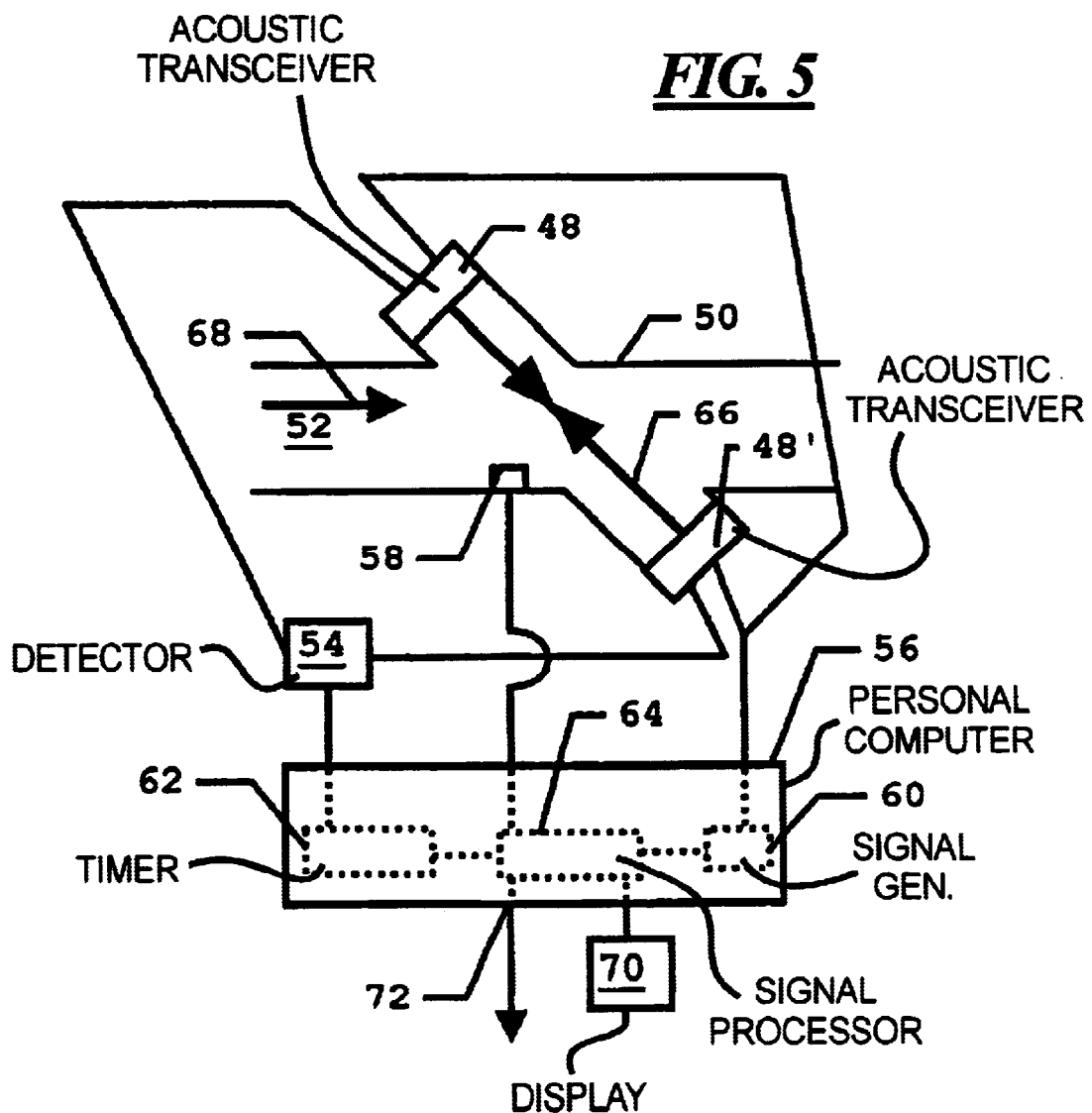
FIG. 5 is a schematic block diagram of a second embodiment of an apparatus according to the present invention.

A further embodiment of an arrangement according to the present invention is shown in FIG. 5.

In this embodiment, a pair of ultrasonic transceivers 48, 48' are located facing one another and spaced apart across a conduit 50 through which a fluid medium 52 can flow, in an arrangement common in the art of fluid flow measurement. As with ultrasound flow meters, each transceiver 48, 48' is able to operate in turn as a complementary ultrasound emitter and receiver so that an ultrasound signal emitted by one transceiver (48', for example), operating as the transmitter can be detected by the other (48, for example) which operates as the receiver, and acoustic velocities in opposite directions between the two transceivers 48, 48' can be obtained from which an acoustic velocity V unaffected by the fluid flow can then be obtained, as described below.

A detector 54, analogous in operation to the detector 18 of FIG. 1, is operably connected to both transceivers 48, 48' to detect the arrival of an ultrasonic signal at one transceiver which was emitted from the other transceiver. The detector circuit 54 provides an output signal indicating the detection of the signal for use by a suitably programmed personal computer 56.

A conventional temperature sensor 58 is located within the conduit 50 to provide a measure of a sensed temperature $T_S$ of the fluid 52 within the conduit 50 to the personal computer 56.

The personal computer 56 is adapted, by suitable programming and the provision of standard interface cards, to provide the functionality of a signal generator 60, a timer 62 and a signal processor 64, analogous in operation to those elements 14, 20, and 4 respectively of FIG. 1. The personal computer 56 thus operates to emit an electric pulse which causes the transceiver 48' to generate an ultrasonic signal which propagates along a path 66, through the fluid 56 flowing, for example, in the direction indicated by the arrow 68, towards the second transceiver 48. The timer 62 may be an incremental counter which operates at the internal clock frequency of the personal computer 56. The counter starts when the computer 56 emits the electrical signal to the transceiver 48' and stops when the output from the detection circuit 54 is received by the computer 56, indicating receipt of an ultrasonic signal by the transceiver 48. The count value thus provides a measure of the transit time $t_1$ of the ultrasonic signal in one direction along the path 66. The computer 56 then operates to emit an electric pulse which causes the other transceiver 48 to generate an ultrasonic signal by which a second transit time $t_2$ in an opposite direction along the path 66 is obtained in the manner as for the time $t_1$ above.

The velocities $V_1$ and $V_2$ of the ultrasonic signals associated with the transit times $t_1$ and $t_2$ can then be calculated by the signal processor 64 according to the equation (1) above. In the present example, the fluid 52 is flowing in the direction indicated by the arrow 68 with a velocity component $V_f$ along the acoustic path 66 in a direction from 48 to 48'. Thus obtained acoustic velocities $V_1$ and $V_2$ will have a component associated with the fluid velocity $V_f$ as:

$$V_1 = V - V_f \quad (5)$$

$$V_2 = V - V_f \quad (6)$$

where V is the acoustic velocity in the gas.

From equations (5) and (6) it can be seen that by programming the signal processor 64 of the computer 56 to subtract the obtained velocities $V_1$ and $V_2$, a value of the fluid flow $V_f$ is obtained and that by programming the computer 56 to add the velocities $V_1$ and $V_2$, a value of the acoustic velocity V is obtained, as the step 28 in FIGS. 2 to 4. The computer 56 is further programmed to determine the instantaneous gas temperature $T_A$ according to one of the methods described with respect of the arrangement of FIG. 1 and illustrated in FIGS. 3 and 4. A signal representing this temperature $T_A$ can be emitted in a form suitable for driving a display 70 to display a visible representation of the instantaneous temperature $T_A$ or may be supplied to an externally-accessible interface 74 in a form suitable for use in controlling ancillary equipment or for volume compensation or other correction common in the art of flow measurement.

Although modifications and changes may be suggested by those skilled in the art, it is the intention of the inventors to embody within the patent warranted hereon all changes and modifications as reasonably and properly come within the scope of their contribution to the art.

We claim:

1. An arrangement for acoustically determining an instantaneous temperature of a fluid, comprising:
    an acoustic velocity monitor which emits acoustic energy into fluid in a fluid zone having an instantaneous temperature and monitors an acoustic velocity of said fluid in said fluid zone and which generates an acoustic velocity output signal related thereto;
    a non-acoustic temperature sensor disposed in said fluid zone which senses a fluid temperature of said fluid in said fluid zone into which the acoustic energy is emitted and which generates a fluid temperature output signal related thereto; and
    a signal processor connected to said acoustic velocity monitor and to said non-acoustic temperature sensor which processes said acoustic velocity output signal and said fluid temperature output signal in combination to determine therefrom said instantaneous temperature of said fluid in said fluid zone into which the acoustic energy is emitted.

2. An arrangement as claimed in claim 1 wherein said signal processor process said fluid temperature output signal to determine information related to a composition of said fluid in said fluid zone, and for determining said instantaneous temperature dependent on said information.

3. An arrangement as claimed in claim 2 wherein said the signal processor processes said acoustic velocity output signal and said temperature sensor output signal to calculate a constant $k$, as said information related to said composition of said fluid in said fluid zone, according to the relationship $k = T_S/V^2$, wherein $T_S$ is said fluid temperature output signal and wherein V is said acoustic velocity output signal.

4. An arrangement as claimed in claim 3 wherein said signal processor processes said acoustic velocity output signal and said temperature sensor output signal during a first time period to obtain an average value $\bar{k}$ of said constant k and, during a second time period, determines said instantaneous temperature dependent on said average $\bar{k}$ value obtained during said first time period and said acoustic velocity output signal obtained in said second time period.

5. A method for acoustically determining an instantaneous temperature of a fluid, comprising the steps of:
    emitting acoustic energy into fluid, having an instantaneous temperature in a fluid zone and acoustically monitoring a velocity of said fluid in said fluid zone to obtain an acoustic velocity value;
    non-acoustically sensing a temperature of said fluid in said fluid zone to obtain a sensed temperature value; and
    determining said instantaneous temperature of said fluid in said fluid zone dependent on said acoustic velocity value and said sensed temperature value.

6. A method as claimed in claim 5 wherein the step of determining said instantaneous temperature comprises deriving information from the sensed temperature value related to a composition of said fluid in said fluid zone and determining said instantaneous temperature dependent on said composition.

7. A method as claimed in claim 6 wherein the step of determining said information related to said composition of said fluid in said fluid zone comprises calculating a constant k based on the relationship $k=T_S/V^2$, wherein $T_S$ is said sensed temperature value and wherein V is said acoustic veiocity.

8. A method as claimed in claim 7 wherein the step of calculating said constant k comprises obtaining, during a first time period, a plurality of acoustic velocity values and at least one sensed temperature value, forming an average value $\overline{V^2}$ of said plurality of acoustic velocity values, forming an average value $\overline{T_S}$ of said at least one sensed temperature values, calculating an average value $\overline{k}$ of said constant k from said average values according to said relationship and, in a second time period obtaining said acoustic velocity vaiue and calculating said instantaneous temperature from said acoustic velocity value obtained in said second time period and said average value $\overline{k}$ obtained in said first time period.

* * * * *